United States Patent
Owens et al.

(10) Patent No.: US 11,913,596 B2
(45) Date of Patent: Feb. 27, 2024

(54) BINOCULAR/TRIPOD ADAPTER SYSTEM

(71) Applicants: Preston Owens, Safford, AZ (US); Brent Jacob, Safford, AZ (US)

(72) Inventors: Preston Owens, Safford, AZ (US); Brent Jacob, Safford, AZ (US)

( * ) Notice: Subject to any disclaimer, the term of this patent is extended or adjusted under 35 U.S.C. 154(b) by 165 days.

(21) Appl. No.: 17/219,337

(22) Filed: Mar. 31, 2021

(65) Prior Publication Data

US 2021/0310601 A1  Oct. 7, 2021

Related U.S. Application Data

(60) Provisional application No. 63/003,992, filed on Apr. 2, 2020.

(51) Int. Cl.
| | |
|---|---|
| *F16M 11/04* | (2006.01) |
| *F16M 13/02* | (2006.01) |
| *G03B 17/56* | (2021.01) |
| *G03B 23/18* | (2006.01) |

(52) U.S. Cl.
CPC .......... *F16M 11/041* (2013.01); *F16M 13/02* (2013.01); *G03B 17/561* (2013.01); *G03B 23/18* (2013.01)

(58) Field of Classification Search
CPC ...... F16M 11/041; F16M 13/02; G02B 23/18; Y10S 224/909
See application file for complete search history.

(56) References Cited

U.S. PATENT DOCUMENTS

| | | | | |
|---|---|---|---|---|
| 2,444,453 | A * | 7/1948 | Larson | G02B 23/18 248/178.1 |
| 3,270,994 | A | 9/1966 | Machan et al. | |
| 4,557,451 | A | 12/1985 | Conway | |
| 5,564,817 | A | 10/1996 | Palmer | |
| 5,625,853 | A | 4/1997 | Ihara | |
| 5,938,155 | A | 8/1999 | Garland | |
| 7,042,660 | B2 * | 5/2006 | Sugita | F16M 13/00 359/822 |
| 7,241,060 | B2 * | 7/2007 | Mootz | F16M 11/105 396/428 |
| 7,905,459 | B2 * | 3/2011 | Cameron | G02B 23/18 248/176.1 |
| 8,264,771 | B2 * | 9/2012 | Yamamoto | G02B 23/18 248/187.1 |
| 9,212,777 | B2 * | 12/2015 | Shi | F41G 11/004 |
| 9,995,430 | B2 * | 6/2018 | Miller | A63J 1/02 |
| 10,795,146 | B2 * | 10/2020 | Garrison | H04M 1/04 |
| 11,122,156 | B2 * | 9/2021 | Liu | F16M 11/041 |
| 11,137,104 | B1 * | 10/2021 | Roddenberry | G03B 17/561 |
| 11,378,794 | B2 * | 7/2022 | Chan | F16M 13/022 |
| 2012/0223196 | A1 * | 9/2012 | Musselman | B60R 11/02 248/220.21 |
| 2021/0141295 | A1 * | 5/2021 | Chu | F16B 2/02 |

* cited by examiner

*Primary Examiner* — Bradley Duckworth
(74) *Attorney, Agent, or Firm* — Lori Woodward

(57) ABSTRACT

The present disclosure provides a binocular/tripod adapter to releasably couple a binocular lens barrel to a photographic-type tripod. The system provides an offset mount to assist in centering the binocular assembly over the tripod. The system is hinged at the halfway point, thus allowing the device to be located centrally on the binoculars. The system does not require the binoculars to be modified from its original state.

10 Claims, 5 Drawing Sheets

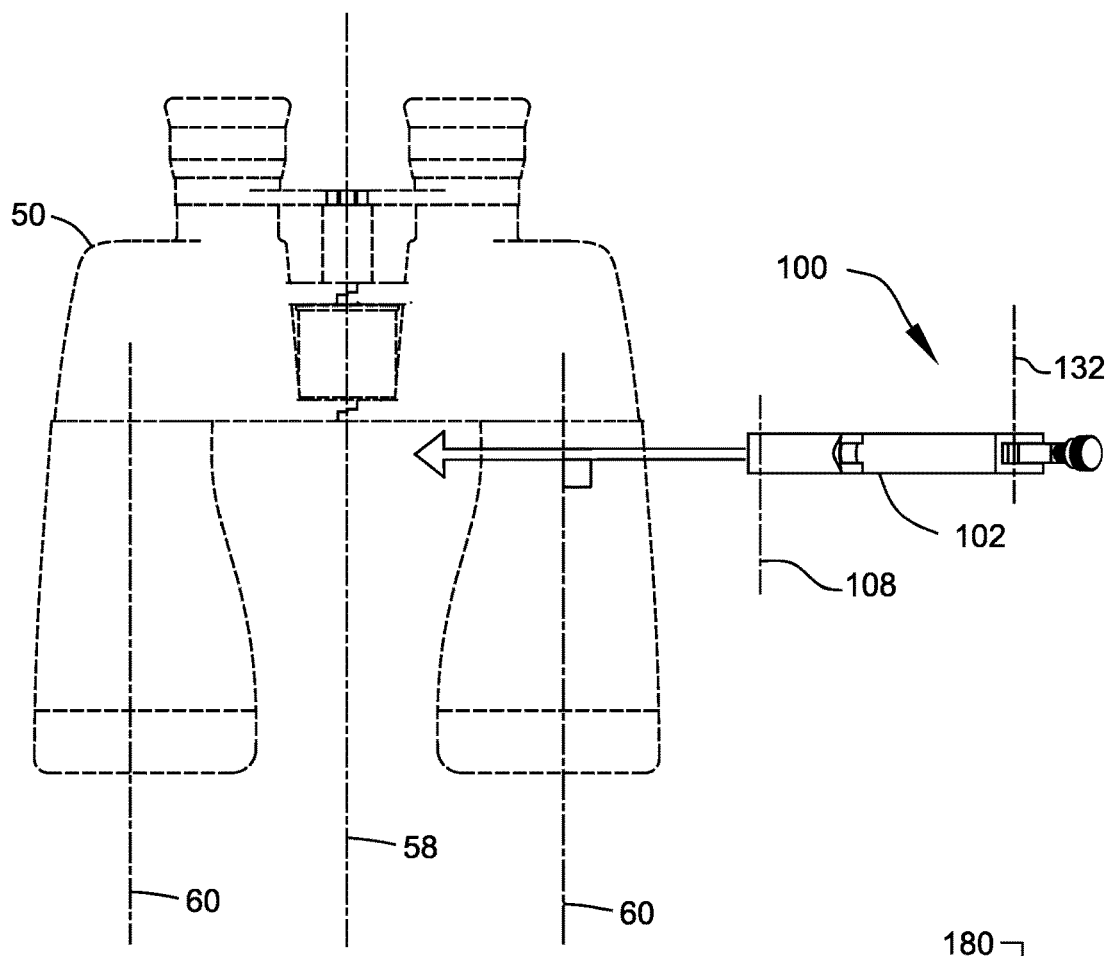
FIG. 9
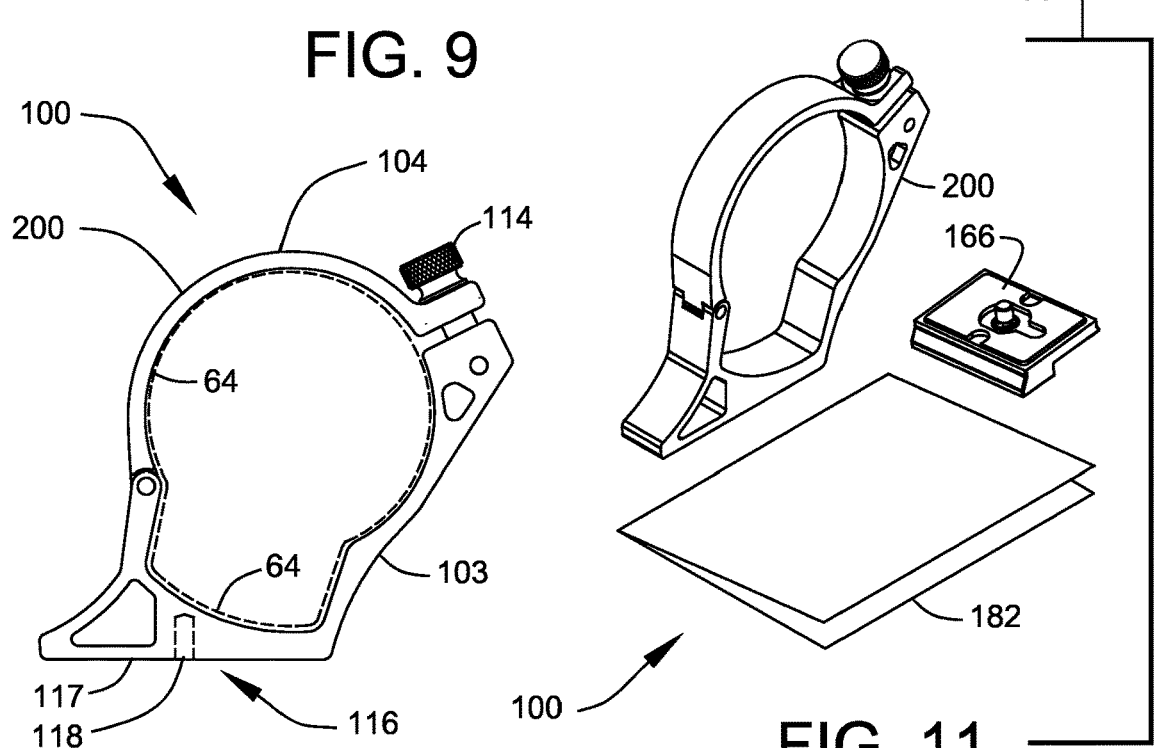
FIG. 10
FIG. 11

BINOCULAR/TRIPOD ADAPTER SYSTEM

CROSS REFERENCE TO RELATED APPLICATION

The present application is related to and claims priority to U.S. Provisional Patent Application No. 63/003,992 filed 2 Apr. 2020, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

FIELD OF THE INVENTION

The present invention relates generally to the field of adapters and more specifically relates to binocular/tripod adapters.

DESCRIPTION OF RELATED ART

Conventional binoculars consist of two telescopic lens barrels mounted side-by-side and aligned to point in the same direction, allowing a viewer to use both eyes when viewing distant objects. Unlike a (monocular) telescope, binoculars give users a three-dimensional view with an impression of depth. The lens barrels of most binoculars are movable about a central pivot axis, thus permitting the distance between the eyepieces of the barrels to be adjusted to fit the user. The central pivot axis is typically located symmetrically between the two lens barrels and roughly coincides with center of balance of the device.

Most binoculars are sized to be held using both hands, although the weight of larger field units can make extended hand support cumbersome. Conventional binoculars are not designed to be mountable to a tripod or similar portable frame or stand. In photography, a tripod is used to stabilize and elevate a camera, a flash unit, or other photographic equipment. Many outdoor enthusiasts would benefit from the use of a tripod to hold and stabilize binoculars; however, most binoculars are not be equipped with the female threaded receptacle found on most cameras. Having an improved means for mounting binoculars to a tripod or other stable platform would benefit many.

Various attempts have been made to solve problems found in adapter art. For example, U.S. Pat. No. 4,557,451 to Joseph Conway relates to binocular rests. The described binocular rests include an elongated support member, a strap for holding a pair of binoculars upon the support member, and a mounting nut for attaching the support member to a tripod. The support member has an upper surface configured to engage the lower surfaces of the binoculars, and the strap attaches over the binoculars to hold them against the contoured upper surface of said support member and to urge winged end portions of the support member against the side surfaces of the binoculars.

BRIEF SUMMARY OF THE INVENTION

In view of the foregoing disadvantages inherent in the known adapter art, the present disclosure provides a novel binocular/tripod adapter system. The general purpose of the present disclosure, which will be described subsequently in greater detail, is to provide binoculars mount that may be useful for releasably mounting binoculars to a tripod. The present invention is superior to other systems in that it effectively provides a binoculars/tripod adapter which may be coupled to binoculars chassis not having a female threaded receptacle. Additionally, the present invention may be useful for providing an adapter that may be couplable to a monocular not having a female threaded receptacle.

A mounting system for mounting binoculars to a tripod is disclosed herein. The mounting system includes a first clamping member configured to engage a first portion of an outer wall of the lens barrel; a second clamping member configured to engage a second portion of the outer wall; a hinge rotationally coupling such first clamping member and such second clamping member about a first axis of rotation, such hinge configured to enable articulation of such first clamping member and such second clamping member between an open configuration and a barrel-clamping configuration, such first clamping member and such second clamping member engaged with the outer wall in such barrel-clamping configuration and such first clamping member and such second clamping member spaced away from the outer wall in such open configuration; a releasable retainer configured to releasably retain such first clamping member and such second clamping member in such barrel-clamping configuration; and joined with such first clamping member, a mount configured to removably mount such first clamping member on the tripod, the position of such mount biased toward the central axis of the binocular, relative to the lens barrel of the binocular, when the mounting system is engaged with such lens barrel.

A method of providing a mounting system is also disclosed herein. The method of may comprise the steps of: identifying commercially-available binoculars to be mounted to a tripod; determining an outer wall configuration of a lens barrel of the binoculars; providing a first clamping member configured to engage a first portion of the outer wall of the lens barrel; providing a second clamping member configured to engage a second portion of the outer wall; providing a hinge rotationally coupling such first clamping member and such second clamping member about a first axis of rotation, such hinge configured to enable articulation of such first clamping member and such second clamping member between an open configuration and a barrel-clamping configuration, such first clamping member and such second clamping member engaged with the outer wall in such barrel-clamping configuration and such first clamping member and such second clamping member spaced away from the outer wall in such open configuration a releasable retainer configured to releasably retain such first clamping member and such second clamping member in such barrel-clamping configuration; and providing a mount configured to removably mount such first clamping member on the tripod, such mount, such mount is integrally formed with such first clamping member; and biasing the position of such mount toward the central axis of the binocular, relative to the lens barrel of the binocular, when such barrel engagement assembly is engaged with such lens barrel.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, binoculars/tripod adapter system, constructed and operative according to the teachings of the present disclosure.

FIG. 9 is a top view of the mounting system of FIG. 1, further illustrating the transition of the mounting system from a detached position to the barrel-clamping configuration, according to preferred embodiments of the present disclosure.

FIG. 10 is a front view, illustrating an alternate embodiment of the mounting system, according to an alternate preferred embodiment of the present disclosure.

FIG. 11 is a perspective view of the mounting system of FIG. 1, arranged as a kit, according to an embodiment of the present disclosure.

The various embodiments of the present invention will hereinafter be described in conjunction with the appended drawings, wherein like designations denote like elements.

DETAILED DESCRIPTION

As discussed above, embodiments of the present disclosure relate to mounting adapters and more particularly to binoculars/tripod adapter system as used to improve the mounting of binoculars to a tripod or similar support structure.

Generally, the system creates a stable system to properly adapt binoculars to a tripod for outdoor use. The system is hinged at the halfway point, thus allowing it achieve a more centered placement on the binoculars. This also allows the adapter to fit securely without being placed on the frontal portion of the binoculars only. The apparatus may be assembled from high-grade aluminum, steel pins, and a knurled thumb screw.

The system does not require the binoculars to be modified in any way from its original state. In operation, the user starts by unscrewing the knurled thumbscrew and allowing the hinge to open. Once the hinge is open the user may place the device over one side of the binoculars, adjust it for center, then tighten the knurled thumb screw. At this point the device may be mounted to the head of the tripod or to a quick-release adapter plate that is made by others, using the standard ¼-inch×20 thread. The adapter plate is then mounted to the tripod head.

Figure 1:
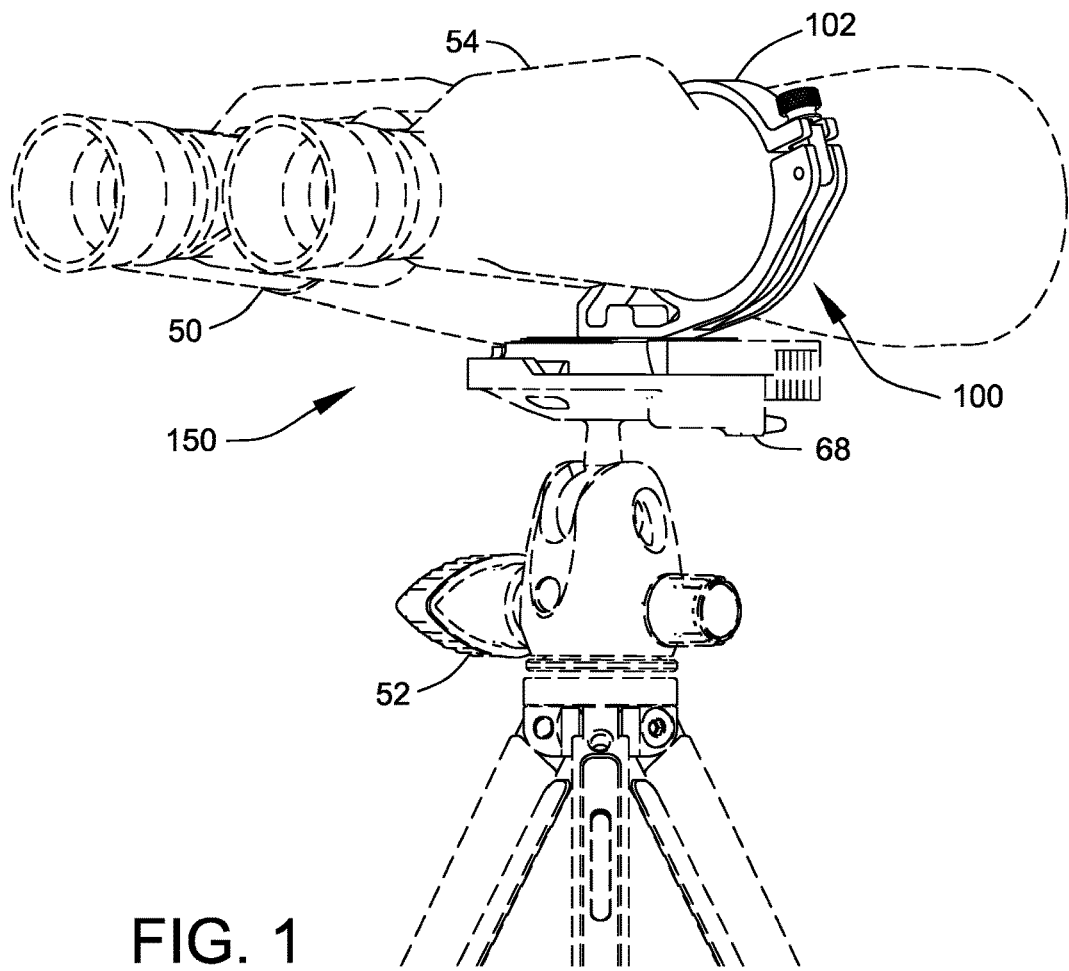
FIG. 1 is a rear perspective view of an adapter mount of the mounting system during an 'in-use' condition, according to an embodiment of the disclosure.

Referring now more specifically to the drawings by numerals of reference, there is shown in FIGS. 1-11, various views of the mounting system 100. FIG. 1 shows an adapter mount 102 of the mounting system 100 during an 'in-use' condition 150, according to an embodiment of the present disclosure. The two-part adapter mount 102 is designed to removably mount binoculars 50 to a conventional photographic-type tripod 52, as shown.

Figure 2:
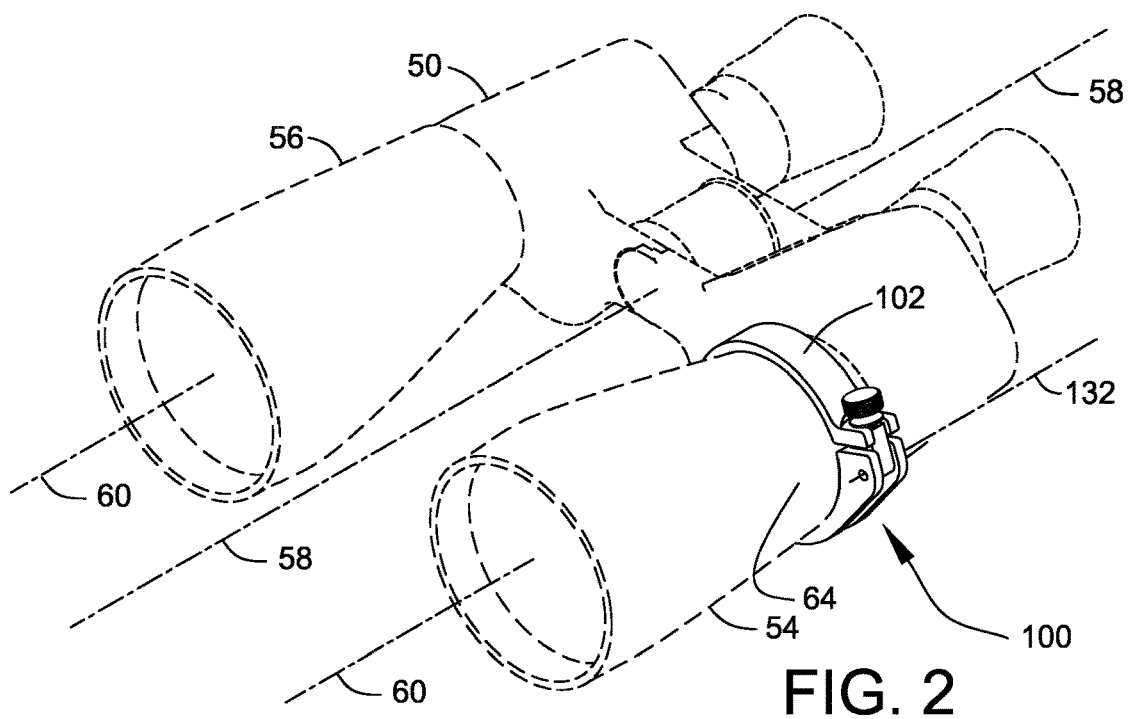
FIG. 2 is a front perspective view of the mounting system of FIG. 1 engaged on a barrel of the binocular, according to an embodiment of the present disclosure.

FIG. 2 is a front perspective view of the adapter mount 102, engaged on the binoculars 50, according to the embodiment of FIG. 1. In the present disclosure, the binoculars 50 depicted in FIG. 2 are of a customary configuration, including a lens barrel 54, an opposing lens barrel 56, and a central axis 58 disposed generally equidistant between and parallel to the respective optical axes 60 of the lens barrel 54 and the opposing lens barrel 56. The lens barrel 54 and opposing lens barrel 56 are configured to pivot about the central axis 58, thus allowing the distance between the eyepieces to be adjusted to fit a user. The adapter mount 102 is designed to firmly clamp onto an outer wall 64 of a selected one of the two lens barrels, as shown.

Figure 3:
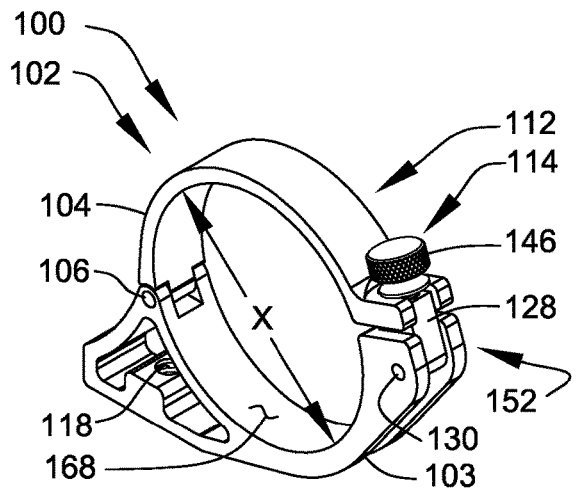
FIG. 3 is a perspective view of the mounting system of FIG. 1, illustrated in a barrel-clamping configuration, according to an embodiment of the present disclosure.
Figure 4:
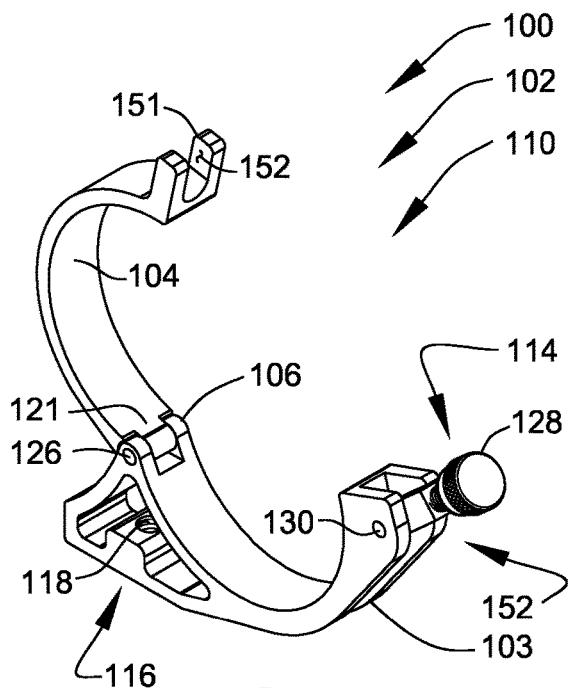
FIG. 4 is a perspective view of the mounting system of FIG. 1, in an open configuration, according to an embodiment of the present disclosure.
Figure 5:
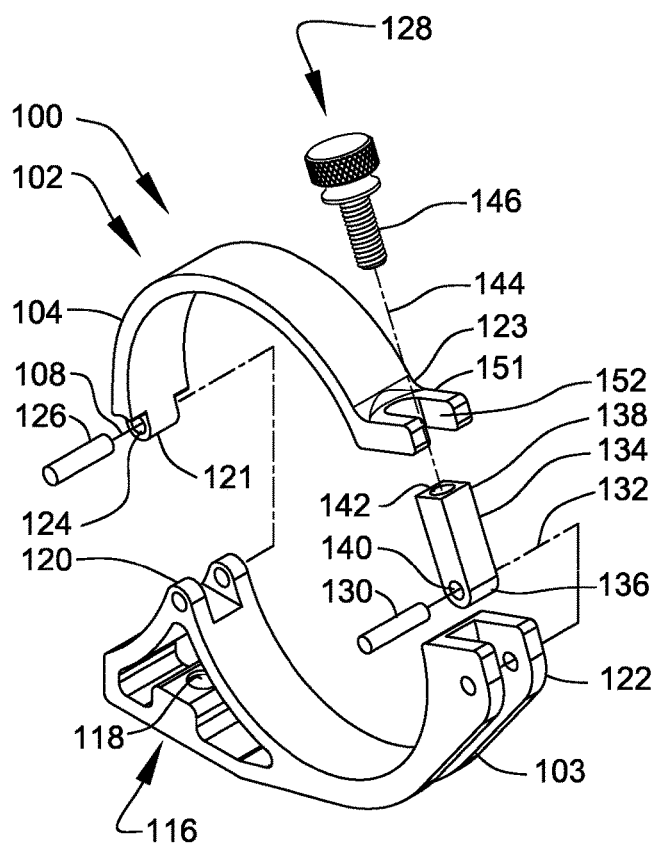
FIG. 5 is an exploded view of the mounting system of FIG. 1, according to an embodiment of the present disclosure.

FIG. 3 is a perspective view of the adapter mount 102 of FIG. 1, illustrated in a closed, barrel-clamping configuration 112. FIG. 4 is a perspective view of the adapter mount 102, adjusted to an open configuration 110 for placement about a lens barrel of the binocular. FIG. 5 is an exploded view of the adapter mount 102, according to the embodiment of FIG. 1. As illustrated, the adapter mount 102 may include a first clamping member 103 and a second clamping member 104, both members configured to engage an outer wall 64 of the lens barrel 54, as shown in FIG. 1 and FIG. 2. In a preferred arrangement of the present disclosure, the first clamping member 103 and the second clamping member 104 may each comprise arcuate-shaped arms configured to substantially encircle the lens barrel 54 when the adapter mount 102 is arranged in the barrel-clamping configuration 112. In one embodiment of the present disclosure, the widths of the first clamping member 103 and the second clamping member 104 may be about ½-inch, although other embodiment widths are contemplated.

In reference to the exploded view of FIG. 5, the first clamping member 103 may include a hinged end 120 and a retained end 122; similarly, the second clamping member 104 may comprise a hinged end 121 and a retainable end 123. The hinged end 121 of the second clamping member 104 may include a first aperture 124 arranged coaxially with a first axis of rotation 108. It is noted that the first axis of rotation 108 may be oriented generally parallel to the optical axis 60 of the lens barrel 54 when the barrel engagement assembly is engaged with the lens barrel 54 (see FIG. 9). A first cylindrical pin 126 may be arranged coaxially with the first axis of rotation 108 and may be firmly engaged within the hinged end 120 of the first clamping member 103. In the present disclosure, the first cylindrical pin 126 is shown engaged within apertures formed within the hinged end 120 of the first clamping member 103. The first cylindrical pin 126 may be rotationally journaled within the first aperture 124 of the second clamping member 104, as shown in FIG. 4. This preferred arrangement forms a hinge 106 rotationally coupling the first clamping member 103 and the second clamping member 104. The hinge 106 allows rotation of the first clamping member 103 and the second clamping member 104 about the first axis of rotation 108, thus enabling articulation of the members between the open configuration 110 of FIG. 4 and the barrel-clamping configuration 112 of FIG. 3.

A releasable retainer 114 may be provided to releasably retain the first clamping member 103 and the second clamping member 104 in in the barrel-clamping configuration 112 of FIG. 1 through FIG. 3. In a preferred arrangement of the present disclosure, the releasable retainer 114 comprises a hinged thumb-bolt assembly 128.

Referring again to the exploded view of FIG. 5, the hinged thumb-bolt assembly 128 may include a second cylindrical pin 130 having a second axis of rotation 132 oriented substantially parallel with the first axis of rotation 108. In the present disclosure, the second cylindrical pin 130 is firmly engaged within two apertures formed within the retained end 122 of the first clamping member 103, as shown.

The hinged thumb-bolt assembly 128 may further include a bar segment 134 having a proximal end 136 and a distal end 138. A second aperture 140 may extend through the proximal end 136 of the bar segment 134 and may be disposed coaxially on the second cylindrical pin 130. In this arrangement, the bar segment 134 is free to pivot about the second axis of rotation 132. A threaded bore 142 may extend within the proximal end 136 and may include a bore axis 144 oriented substantially perpendicular to the second axis of rotation 132. A thumb-bolt 146 may be provided, which may be threaded within the threaded bore 142, as shown in FIG. 4.

The retainable end 123 of the second clamping member 104 may include a flange 151 having a U-shaped slot 152 configured to receive the thumb-bolt 146, as shown. A shank portion of the thumb-bolt 146 passes within the U-shaped slot 152 as the hinged thumb-bolt assembly 128 is moved between a slot-engaged position 154 shown in FIG. 3 and the slot-disengaged position 156 shown in FIG. 4.

The thumb-bolt 146 is threadedly adjustable so as to translate in and out of the threaded bore 142 along bore axis 144. This allows the thumb-bolt 146 to be adjusted to engage the flange 151 when the hinged thumb-bolt assembly 128 is pivoted to the slot-engaged position 154. A user may adjust the size of the engagement aperture 168 of the device by threadedly adjusting the thumb-bolt 146 when the bolt is engaged with the flange 151, thereby closing and tightening the arm members on the outer wall 64 of the lens barrel 54 (see FIG. 2). More specifically, the size of the engagement aperture 168 may be adjusted by altering the separation distance X between the first clamping member 103 and the second clamping member 104 (see FIG. 3).

Figure 6:
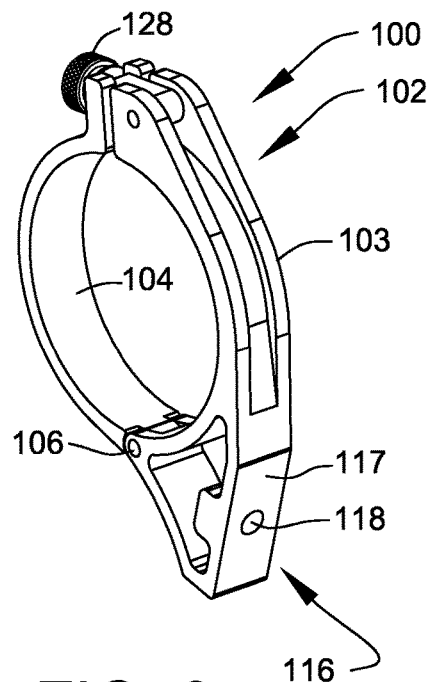
FIG. 6 is a bottom view of the mounting system of FIG. 1, according to an embodiment of the present disclosure.

FIG. 6 is a bottom view of the adapter mount 102 of FIG. 1, according to an embodiment of the present disclosure. In a preferred arrangement of the present disclosure, the first clamping member 103 may include a mount 116 configured to removably mount the first clamping member 103 on the tripod 52, as illustrated in FIG. 1.

In a preferred arrangement of the present disclosure, the mount 116 is integrally formed with the first clamping member 103, as shown. The mount 116 may include a planar surface 117 integrally formed within the first clamping member 103. The planar surface 117 may be configured to mate to a planar surface of the mounting head 68 (see FIG. 1 and FIG. 7). The planar surface 117 may include at least one female threaded socket 118 adapted to receive a male threaded securing bolt commonly used in tripod heads.

In a preferred arrangement of the present disclosure, the threaded socket 118 conforms to at least one standard tripod connection format as defined in section 1222 of the International Organization for Standardization (ISO). ISO 1222 specifies the screw connections used between a camera and a tripod or other accessories. In a preferred arrangement of the present disclosure, the threaded socket 118 may comprise ¼-inch 20 pitch UNC Unified Coarse Threads (6.35-millimeter outer diameter with a 5.35-millimeter hole diameter) as commonly used on viewfinder cameras, SLR cameras up to medium format cameras, quick release plates and tripod heads. Alternately, the mount 116 may include a larger threaded socket 118 comprising ⅜-inch 16 pitch UNC Unified Coarse Thread (9.52-millimeter outer diameter with an 8.25-millimeter hole diameter), which is used on most medium format cameras and all large format cameras, as well as most connections between tripods and tripod heads. Upon reading this specification, it should be appreciated that, under appropriate circumstances, considering such issues as user preferences, design preference, structural requirements, marketing preferences, cost, technological advances, etc., other connection arrangements such as, for example, alternate thread sizes, other mounting formats and assemblies, etc., may be sufficient.

The components of the adapter mount 102, including the first clamping member 103 and the second clamping member 104, may be constructed from one or more rigid materials. In a preferred arrangement of the present disclosure, the components of the adapter mount 102 are constructed from metal with aluminum being most preferred for the construction of the first clamping member 103 and the second clamping member 104. Upon reading this specification, it should be appreciated that, under appropriate circumstances, considering such issues as user preferences, design preference, structural requirements, marketing preferences, cost, available materials, technological advances, etc., other material arrangements such as, for example, rigid polymers, composite materials, alternate lightweight metals such as titanium, etc., may be sufficient.

Components of the adapter mount 102 may be formed by molding, casting, additive printing, subtractive cutting, and other well-known processes. For example, the first clamping member 103 and the second clamping member 104 may be fabricated from aluminum stock using a Computer Numerical Control (CNC) milling process. A selected color may be applied to the components of the adapter mount 102 using one or more well-known processes. These include the application of coatings or by applying an electrochemical anodized finish. Those with ordinary skill in the art will now appreciate that upon reading this specification and by their understanding the art of electrochemical anodization as described herein, methods of implementing an anodization process will be understood by those knowledgeable in such art.

Figure 7:
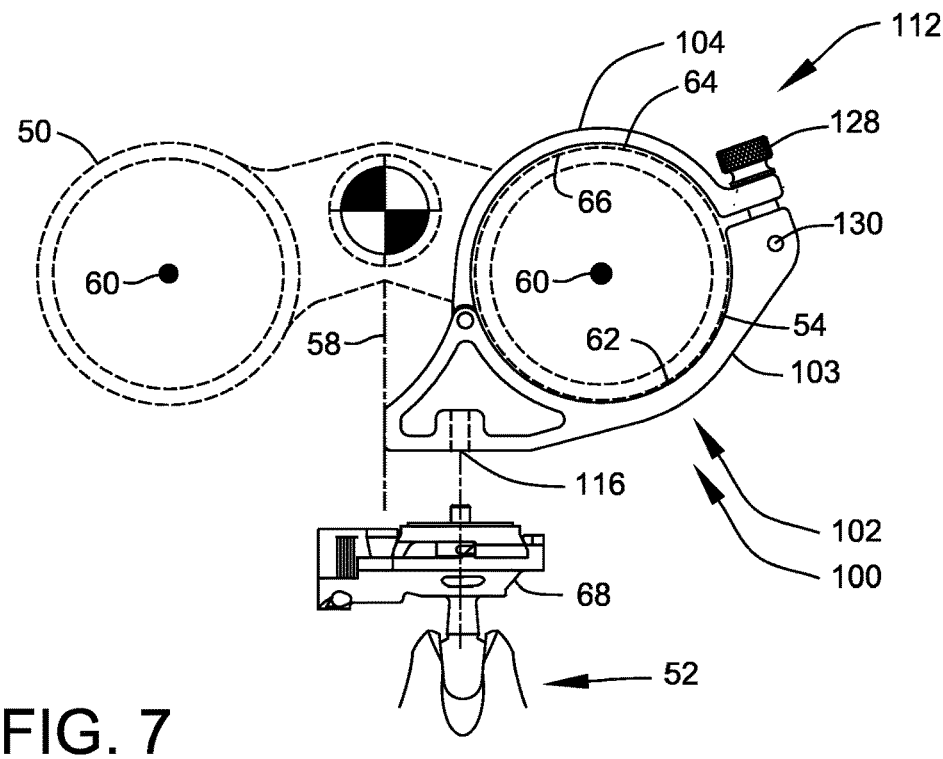
FIG. 7 is a front view of the mounting system of FIG. 1, illustrating the mounting geometry of the mounting system, according to preferred embodiments of the present disclosure.

FIG. 7 is a front view of the mounting system 100 of FIG. 1, illustrating the mounting geometry of the adapter mount 102, according to preferred embodiments of the present disclosure. As illustrated, the first clamping member 103 may be configured to engage a first portion 62 of the outer wall 64 of the lens barrel 54. The second clamping member 104 may be similarly configured to engage a second portion 66 of the outer wall 64, as shown. In the present disclosure, the first clamping member 103 and the second clamping member 104 each encircle about one half of the circumference of the outer wall 64, as shown.

In a preferred embodiment of the present disclosure, the position of the mount 116 is biased toward the central axis 58 of the binoculars 50, relative to the lens barrel 54 of the binoculars 50, when the adapter mount 102 of the mounting system 100 is engaged with the lens barrel 54. This preferred feature of the mounting system functions to shift the center of mass of the binoculars 50 toward the mounting head 68 of the tripod 52, thus improving balance and stability during use.

Figure 8:
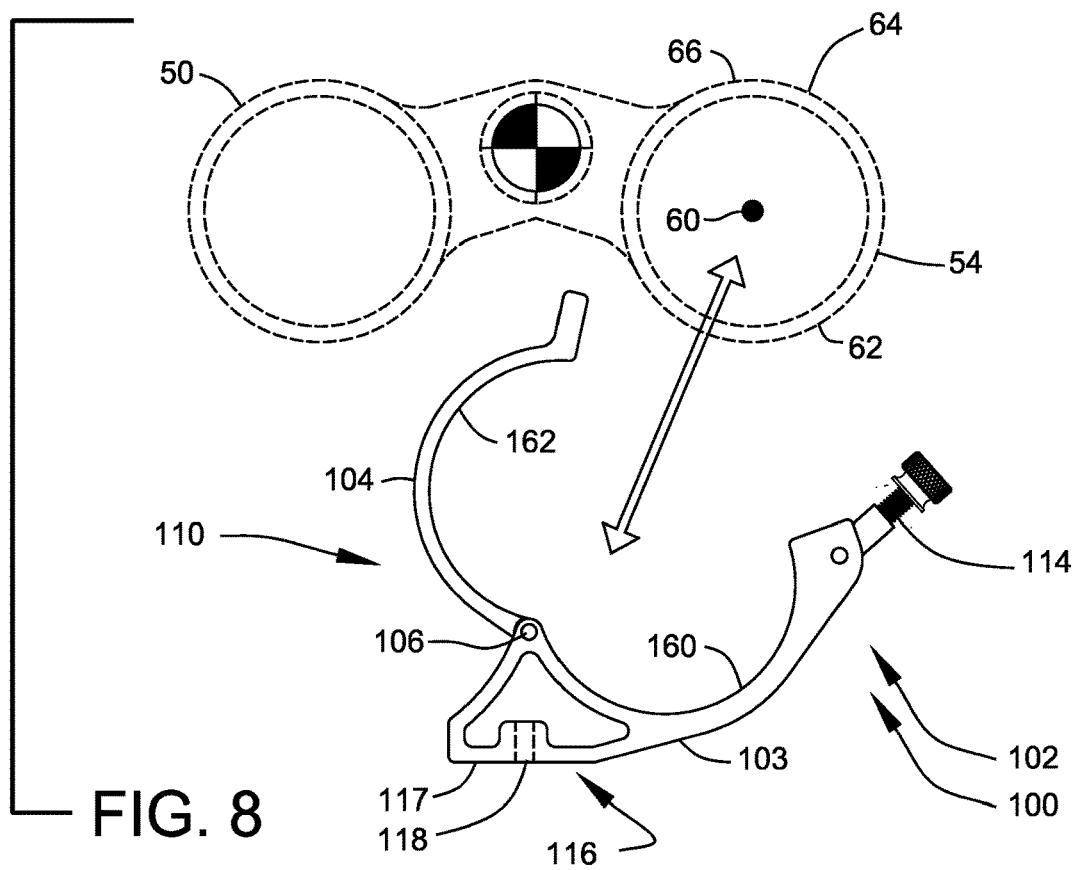
FIG. 8 is a front view of the mounting system of FIG. 1, illustrating transitional movement of the mounting system from a detached position to the barrel-clamping configuration, according to preferred embodiments of the present disclosure.

FIG. 8 is a front view of the adapter mount 102 of FIG. 1, illustrating the installation of the adapter mount 102 on the binoculars 50. FIG. 9 is a top view of the mounting system of FIG. 1, further illustrating the illustrating the installation of the adapter mount 102 on the binoculars 50. As above, the first clamping member 103 and the second clamping member 104 are spaced away from the outer wall 64 of binoculars 50 in the open configuration 110, as shown. When the first clamping member 103 and the second clamping member 104 are arranged in the open configuration 110, the adapter mount 102 is moveable from a detached position to the barrel-clamping configuration 112 (see FIG. 7) by movements limited to those perpendicular to the optical axis 60 of the lens barrel 54, as shown. This arrangement provides a number advantages; in particular, the adapter mount 102 may be installed between connecting structures of the binoculars 50, thereby expanding the potential mounting positions of the device. In addition, installation of the adapter mount 102 does not require the binoculars to be modified in any way from its original state.

The first clamping member 103 may comprise a first engagement surface 160 configured to generally match the shape of the first portion 62 of the outer wall 64 with the second clamping member 104 comprising a second engagement surface 162 configured to generally match the shape of the second portion 66 of the outer wall 64. In this arrangement, the area of contact between the clamping members and the outer wall 64 is maximized.

FIG. 10 is a front view, illustrating an alternate adapter mount 200 of the mounting system 100, according to an alternate preferred embodiment of the present disclosure. As above, the geometric shapes of the first clamping member 103 and the second clamping member 104 are configured to generally match the shape of the outer wall 64 of the binoculars 50. It is noted that the shape of either or both of the clamping members may be modified to fit the outer wall 64 of specific brands and models of binoculars. In the alternate adapter mount 200 of FIG. 10, the first clamping member 103 comprises a shape accommodating a protrusion of the outer wall 64. Such projections often appear in high-end sporting optics and may accommodate internal prism assemblies, rangefinder electronics, or other internal structures. In the present disclosure, the alternate adapter mount 200 may be adapted to accommodate, for example, EL Range binoculars produced by Swarovski Optik of Absam, Austria (www.swarovskioptik.com). In this example model, a protruding "bump" on the underside of each lens barrel houses the hardware for a rangefinder system. Upon reading this specification, it should be appreciated that, under appropriate circumstances, considering such issues as user preferences, design preference, structural requirements, marketing preferences, cost, technological advances, etc., other shape arrangements such as, for example, alternate geometric shapes accommodating other binocular models, the use of resilient (shape-conforming) materials, etc., may be sufficient.

FIG. 11 is a perspective view of the mounting system of FIG. 1, arranged as a kit 180, according to an embodiment of the present disclosure. According to one embodiment, the adapter mount 102 of the mounting system 100 may be arranged as a kit 180. The kit 180 may include the adapter mount 102 and a set of instructions 182. The instructions may detail functional relationships in relation to the structure of the adapter mount 102 of the mounting system 100 (such that the adapter mount 102 of the mounting system 100 can be used, maintained, or the like, in a preferred manner). In another embodiment, the kit 180 may also include a quick-release plate 166 configured to releasably couple the mount 116 with the tripod 52. Such quick-coupling devices are suitable for the rapid fixing and releasing of the binoculars 50 to the tripod 52, and particularly to those attachable to a quick-release-type mounting head 68 of the tripod 50. Those with ordinary skill in the art will now appreciate that upon reading this specification and by their understanding the art of photographic quick-release plates as described herein, methods of supplying such devices will be understood by those knowledgeable in such art. Upon reading this specification, it should be appreciated that, under appropriate circumstances, considering such issues as user preferences, design preference, structural requirements, marketing preferences, cost, available materials, technological advances, etc., other kit arrangements such as, for example, providing multiple adapter mounts for multiple binocular models, providing a storage bag, including a tripod or other tripod accessories, etc., may be sufficient.

Figure 12:
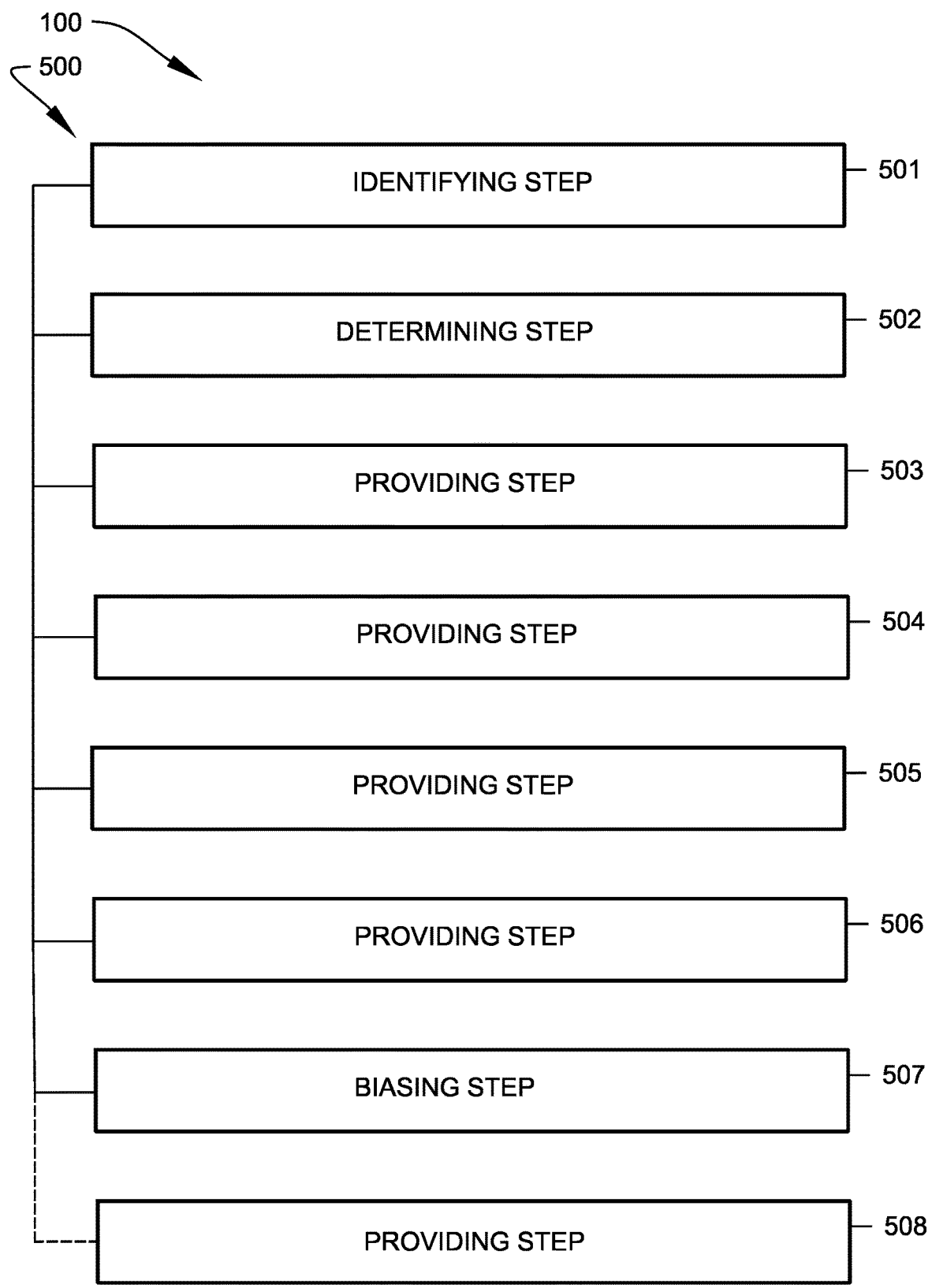
FIG. 12 is a flow diagram illustrating a method of providing the mounting system, according to an embodiment of the present disclosure.

FIG. 12 is a flow diagram illustrating a method 500 of producing a mounting system for mounting binoculars to a tripod, according to an embodiment of the present disclosure. As illustrated, the method 500 may include the steps of: step one 501, identifying commercially-available binoculars to be mounted to the tripod; step two 502, determining the configuration of an outer wall of a lens barrel of the selected binoculars; step three 503, providing a first clamping member configured to engage a first portion of the outer wall of the lens barrel; step four 504, providing a second clamping member configured to engage a second portion of the outer wall; step five 505, providing a hinge rotationally coupling the first clamping member and the second clamping member about a first axis of rotation, the hinge configured to enable articulation of the first clamping member and the second clamping member between an open configuration and a barrel-clamping configuration, the first clamping member and the second clamping member adapted to engage with the outer wall in the barrel-clamping configuration, the first clamping member and the second clamping member spaced away from the outer wall in the open configuration and a releasable retainer configured to releasably retain the first clamping member and the second clamping member in the barrel-clamping configuration; step six 506, providing a mount configured to removably mount the first clamping member on the tripod, the mount integrally formed with the first clamping member; and step seven 507, biasing the position of the mount toward the central axis of the binoculars, relative to the lens barrel of the binoculars, when the barrel engagement assembly is engaged with the lens barrel.

Even further, method 500, further may comprise the step eight 508 of providing within the mount, at least one threaded socket conforming to at least one tripod connection format as defined in section 1222 of the International Organization for Standardization.

It should be noted that step 508 is an optional step and may not be implemented in all cases. Optional steps of method 500 are illustrated using dotted lines in FIG. 12 so as to distinguish them from the other steps of method 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for mounting system 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the apprehended claims:

1. A mounting system for mounting binoculars to a tripod, the binoculars having a lens barrel, an opposing lens barrel, and a central axis disposed generally equidistant between and parallel to the respective optical axes of the lens barrel and the opposing lens barrel, the tripod defining a center vertical axis centered between its legs, the mounting system comprising:
   a first clamping member configured to engage a first portion of an outer wall of the lens barrel, said first clamping member including a first hinged end and a first retained end;
   a second clamping member configured to engage a second portion of the outer wall, said second clamping member including a second hinged end and a second retainable end, said second hinged end including a first aperture arranged coaxially with a first axis of rotation, said first axis of rotation positioned between the respective optical axes of the lens barrel and the opposing lens barrel;
   a hinge rotationally coupling the first clamping member and the second clamping member about the first axis of rotation, said hinge including a first cylindrical pin arranged coaxially with the first axis of rotation, said first cylindrical pin engaged with the first hinged end of the first clamping member and rotationally journaled within the first aperture of the second clamping member, said hinge configured to enable articulation of the first clamping member and the second clamping member between an open configuration and a barrel-clamping configuration, said open configuration being where the second clamping member is disengaged and spaced away from the second portion of the outer wall, said barrel-clamping configuration being where the first clamping member and the second clamping member are engaged with the outer wall;
   a releasable retainer configured to releasably retain the first clamping member and the second clamping member in the barrel-clamping configuration; and,
   a mount joined with the first clamping member, and configured to removably mount the first clamping member on the tripod, the mount further configured to position the center vertical axis of the tripod between the respective optical axes of the lens barrel and the opposing lens barrel of the binoculars, when the first clamping member and the second clamping member are engaged with the outer wall of the lens barrel in the barrel-clamping configuration; and
   wherein the first axis of rotation is oriented generally parallel to the optical axis of the lens barrel when the first clamping member and the second clamping member are engaged with the outer wall of the lens barrel in the barrel-clamping configuration;
   wherein the releasable retainer includes a hinged thumb-bolt assembly;
   wherein the retained end of the first clamping member includes a second cylindrical pin having a second axis of rotation oriented substantially parallel with said first axis of rotation, said second cylindrical pin engaged with the retained end of the first clamping member; and
   wherein the hinged thumb-bolt assembly includes
      a bar segment comprising a proximal end and a distal end,
      a second aperture extending through the proximal end and disposed coaxially on the second cylindrical pin,
      a threaded bore extending within the proximal end, the threaded bore comprising a bore axis oriented substantially perpendicular to the second axis of rotation, and
      a thumb-bolt threadably engaged within the threaded bore.

2. The mounting system of claim 1 wherein said mount comprises a threaded socket configured to removably receive a mounting screw of the tripod.

3. The mounting system of claim 1 wherein said mount is integrally formed with said first clamping member.

4. The mounting system of claim 1, wherein said retainable end of said second clamping member comprises a flange having a u-shaped slot configured to receive said thumb-bolt.

5. The mounting system of claim 4, wherein
   the hinged thumb-bolt assembly is moveable about the second axis of rotation between a slot-engaged position and a slot-disengaged position, the thumb-bolt threadedly adjustable to engage the flange when the hinged thumb-bolt assembly is arranged in the slot-engaged position; and
   a separation distance between the first clamping member and the second clamping member is modifiable by threadedly adjusting the thumb-bolt when engaged with said flange.

6. The mounting system of claim 5, wherein the first clamping member comprises a first engagement surface configured to substantially match a shape of the first portion of the outer wall;
   wherein the second clamping member includes a second engagement surface configured to substantially match a shape of the second portion of the outer wall;
   wherein the mount includes a threaded socket configured to removably receive a mounting screw of the tripod;

wherein the mount is integrally formed with the first clamping member;

wherein the first clamping member and the second clamping member each includes arcuate-shaped arms configured to substantially encircle the lens barrel when arranged in the barrel-clamping configuration;

wherein the threaded socket conforms to at least one tripod connection format as defined in section 1222 of the International Organization for Standardization; and wherein the first clamping member and the second clamping member are made of aluminum.

7. The mounting system of claim 1 wherein said first clamping member and said second clamping member each comprise arcuate-shaped arms configured to substantially encircle the lens barrel when arranged in said barrel-clamping configuration.

8. The mounting system of claim 1 wherein said first clamping member and said second clamping member are comprised of a rigid material.

9. The mounting system of claim 1 wherein said first clamping member and said second clamping member are comprised of metal.

10. The mounting system of claim 1, wherein the first clamping member comprises a first engagement surface configured to substantially match a shape of the first portion of the outer wall; and wherein the second clamping member includes a second engagement surface configured to substantially match a shape of the second portion of the outer wall.

\* \* \* \* \*